United States Patent
Hochstetler et al.

(10) Patent No.: US 7,032,749 B2
(45) Date of Patent: Apr. 25, 2006

(54) TOOL CASE HAVING SCABBARD WITH ADJUSTABLE LENGTH

(76) Inventors: Tina A. Hochstetler, 66318 Blue School Rd., Constatine, MI (US) 49042; Jon T. Newsome, 3437 Ridgenhill Cir., Dacula, GA (US) 30019

( * ) Notice: Subject to any disclaimer, the term of this patent is extended or adjusted under 35 U.S.C. 154(b) by 108 days.

(21) Appl. No.: 10/291,368

(22) Filed: Nov. 12, 2002

(65) Prior Publication Data

US 2003/0066772 A1    Apr. 10, 2003

Related U.S. Application Data

(63) Continuation of application No. 09/800,722, filed on Mar. 8, 2001, now abandoned.

(51) Int. Cl.
*A45C 11/26* (2006.01)
*B65D 85/00* (2006.01)

(52) U.S. Cl. .......... 206/349; 206/320

(58) Field of Classification Search .......... 206/349, 206/370, 315.11, 320; D3/269, 370; 220/8, 220/4.03
See application file for complete search history.

(56) References Cited

U.S. PATENT DOCUMENTS

| | | | |
|---|---|---|---|
| 2,788,889 A | 4/1957 | Turnbow | |
| 2,826,294 A | 3/1958 | Nicodemus | |
| 3,344,818 A * | 10/1967 | Musgrove | 83/814 |
| 3,430,760 A | 3/1969 | Ulmer | |
| 3,530,910 A * | 9/1970 | Cairns | 83/860 |
| 3,674,169 A * | 7/1972 | Miller | 220/4.21 |
| 3,674,190 A * | 7/1972 | Wright | 206/315.11 |
| 3,744,687 A * | 7/1973 | Oreck | 294/137 |
| 4,046,279 A | 9/1977 | Rosler | |
| 4,063,358 A * | 12/1977 | Hodge | 30/371 |
| D248,508 S * | 7/1978 | Malcolm | D3/269 |
| 4,257,162 A | 3/1981 | Pardon | |
| 4,369,575 A * | 1/1983 | Schurman | 30/151 |
| D267,754 S * | 2/1983 | Carroll et al. | D3/269 |
| 4,371,079 A * | 2/1983 | Dembicks | 206/349 |
| 4,392,674 A | 7/1983 | Evon | |
| 4,625,783 A * | 12/1986 | Notaras et al. | 30/382 |
| 5,119,937 A * | 6/1992 | Reynolds, Jr. | 206/349 |
| 5,156,156 A * | 10/1992 | Ruzich | 30/382 |
| D359,849 S * | 7/1995 | Griffin | D3/269 |
| 5,435,065 A * | 7/1995 | Raczykowski | 30/382 |
| 5,450,956 A * | 9/1995 | Peckenpaugh et al. | 206/315.11 |
| 5,662,220 A | 9/1997 | Schurman | |
| 5,706,941 A | 1/1998 | Erisoty | |
| 6,389,700 B1 * | 5/2002 | Paquin | 30/382 |
| 6,659,276 B1 * | 12/2003 | Anderson et al. | 206/349 |

FOREIGN PATENT DOCUMENTS

| | | |
|---|---|---|
| JP | 0 273 808 | 7/1988 |
| JP | 2000 176909 | 6/2000 |

* cited by examiner

*Primary Examiner*—Mickey Yu
*Assistant Examiner*—J. Gregory Pickett
(74) *Attorney, Agent, or Firm*—McKenna Long & Aldridge LLP

(57) ABSTRACT

A chain saw case has an adjustable scabbard that telescopes to allow for different lengths of chain bar. The scabbard also has an opening along one side to allow visibility of the side of the chain saw bar and any markings, including branding, on the chain saw bar. The chain saw case is designed to be fabricated using injection-molding techniques. Because the scabbard collapses, and the injection molded case offers ample space not afforded in all existing blow molded chain saw cases, the scabbard can be placed inside the case during shipment reducing shipping cost and space required while in distribution.

40 Claims, 4 Drawing Sheets

TOOL CASE HAVING SCABBARD WITH ADJUSTABLE LENGTH

This application is a continuation of prior application Ser. No. 09/800,722, filed Mar. 8, 2001, now abandoned, the contents of which are hereby incorporated by reference.

BACKGROUND OF THE INVENTION

1. Field of the Invention

The present invention relates to a plastic case including a scabbard for housing a chain saw, and more particularly to a plastic case having a scabbard that is adjustable to house chain bars having different lengths.

2. Discussion of the Related Art

Currently, a variety of plastic cases are used to hold chain saws. Such known cases share the characteristic that the chain bar is held within a plastic scabbard that extends from the body of the case.

Chain Bars having different lengths may be placed on the chain saw. Thus, a single chain saw may accommodate chain saw bars of different length. Typically, chain saw bars are selected from the lengths of 16, 18, and 20 inches. The result is that known cases have excessively long scabbards that can accommodate the longest possible chain bar length. Otherwise, a different size scabbard may be required for the same chain saw when different length chain bars are attached to the chain saw.

In addition, most conventional chain saw bars 200, as shown in FIG. 1, include merchandising, branding or other markings thereon. Known chain saw cases and scabbards that protectively cover the chain bar also completely enclose the chain bar, thus covering any markings, merchandising or branding on the side of the chain saw bar.

Currently, no chain saw case exists that allows for housing different lengths of chain bars. Also, no chain saw case exists that allows for visibility of markings, merchandising or branding on the chain saw bar when the chain saw is held in the case.

Moreover, current chain saw cases have a scabbard that extends from the case, making stacking and storage difficult.

SUMMARY OF THE INVENTION

Accordingly, the present invention relates to an innovative chain saw case with an adjustable scabbard that substantially obviates one or more of the problems due to the limitations and disadvantages of the related art.

An object of the present invention is to provide one size chain saw case that houses a chain saw with a variety of lengths of chain bars.

Another object of the present invention is to provide a chain saw case with a partially open scabbard so that markings on a chain bar are visible.

Another object of the present invention is to provide an effective way to ship the scabbard, by collapsing the scabbard, to fit inside of the injection molded chain saw case.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a chain saw case comprises a main compartment for housing a chain saw body; a scabbard extending from a side wall of the main compartment, the scabbard including a first scabbard portion engaged in the side wall of the main compartment and a second scabbard portion slideably inserted into a distal end of the first scabbard portion; the first scabbard portion including a plurality of notches, wherein the notches engage a proximal end of the second scabbard portion and stop movement of the second scabbard portion.

In another aspect of the present invention, a chain saw case comprises a main compartment for housing a chain saw body; a scabbard extending from a side wall of the main compartment, the scabbard including a first scabbard portion engaged in the side wall of the main compartment and a second scabbard portion slideably inserted into a distal end of the first scabbard portion; the second scabbard portion including a plurality of notches, wherein the notches engage a distal end of the first scabbard portion and stop movement of the second scabbard portion.

In another aspect of the present invention, a chain saw case comprises a main compartment; a scabbard extending from a side wall of the main compartment, the scabbard including a first scabbard portion and a second scabbard portion, the second scabbard portion slideably insertable into the first scabbard portion; a plurality of notches on the first scabbard portion; and a protrusion on the second scabbard portion, the protrusion having a shape to engage one of the plurality notches when the second scabbard portion is inserted into the first scabbard portion and fix movement of the second scabbard portion within the first scabbard portion.

In another aspect of the present invention, a chain saw case comprises a main compartment; a scabbard extending from a side wall of the main compartment, the scabbard including a first scabbard portion and a second scabbard portion, the second scabbard portion slideably insertable into the first scabbard portion; a plurality of notches on the second scabbard portion; and a protrusion on the first scabbard portion, the protrusion having a shape to engage one of the plurality notches when the second scabbard portion is inserted into the first scabbard portion and fix movement of the second scabbard portion within the first scabbard portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
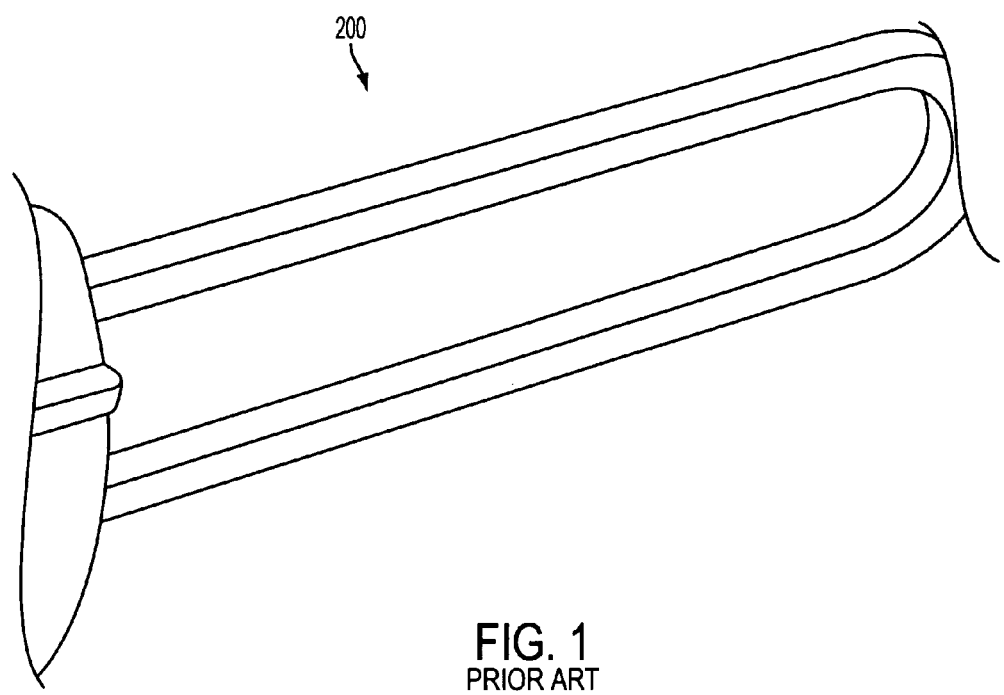
FIG. 1 shows a conventional chain saw bar.
Figure 2A:
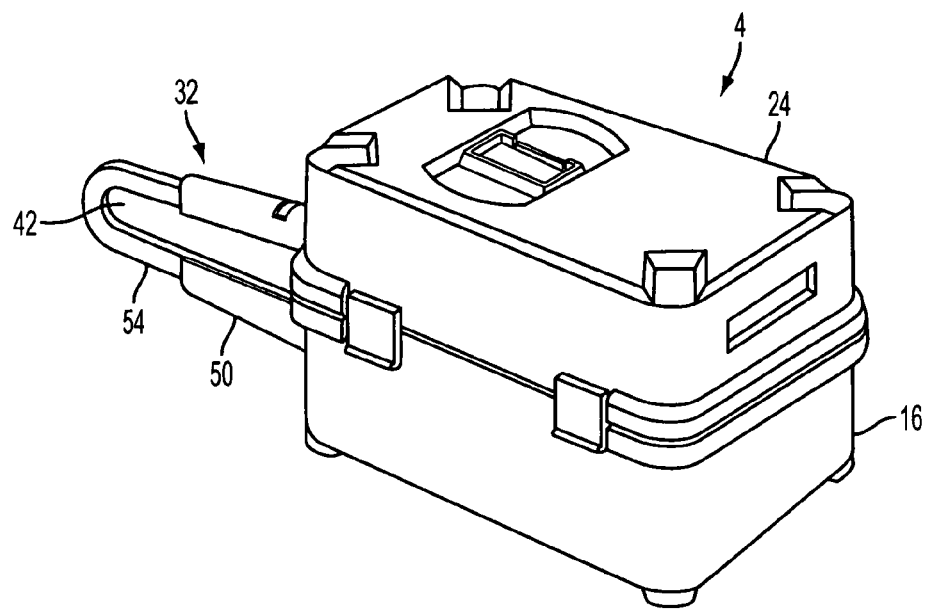
FIGS. 2A and 2B show a chain saw case having an adjustable scabbard.
Figure 2B:
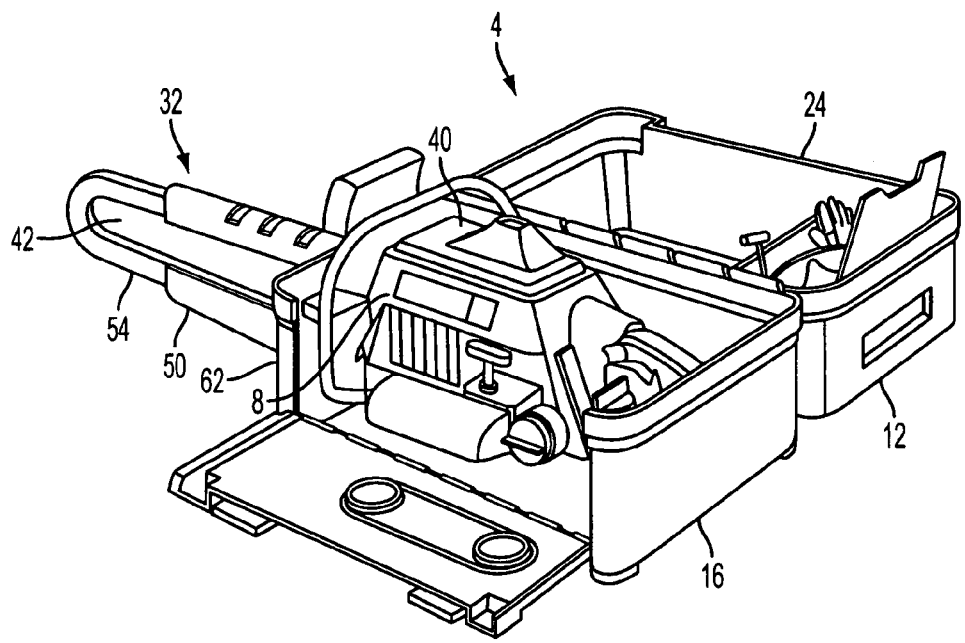

As shown in FIGS. 2A and 2B, a case 4 for housing a chain saw 8 includes a main compartment 12 formed of a base 16, and a cover 24. The case further includes a scabbard 32 for housing the chain bar of a chain saw 8.

As shown in FIG. 2B, a conventional chain saw 8 includes a main chain saw portion 40 and a chain saw bar 42 (partially shown). The chain bar portion is shown in more detail in FIG. 2.

Figure 3:
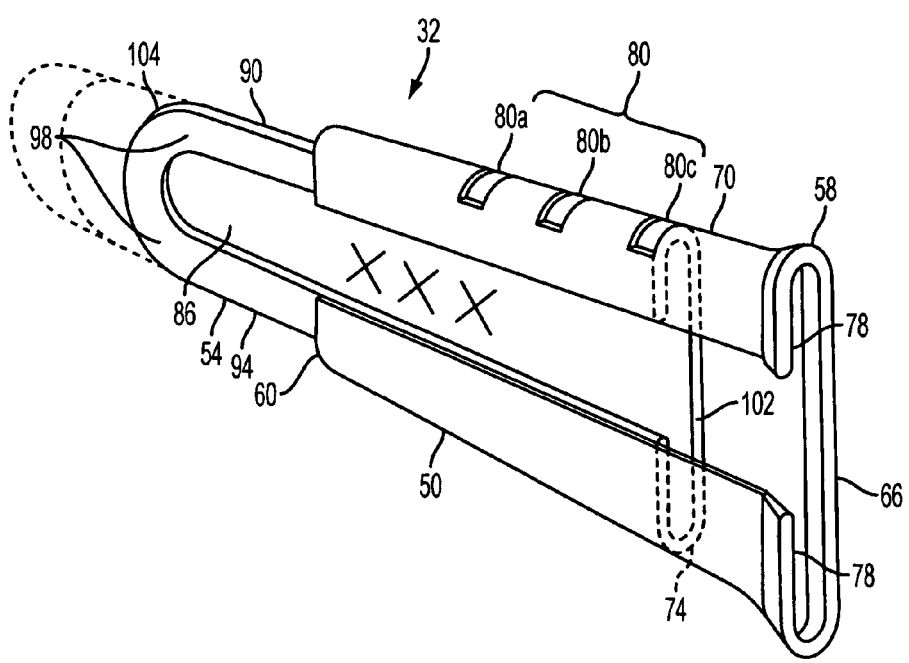
FIG. 3 shows a preferred embodiment of an adjustable chain saw scabbard.

The scabbard 32 is hollow to hold the chain bar 42 therein. The scabbard 32 includes a first scabbard portion 50 and a second scabbard portion 54, as shown in FIG. 3. The first scabbard portion 50 has a proximal end 58 and a distal end 60.

Figure 4A:
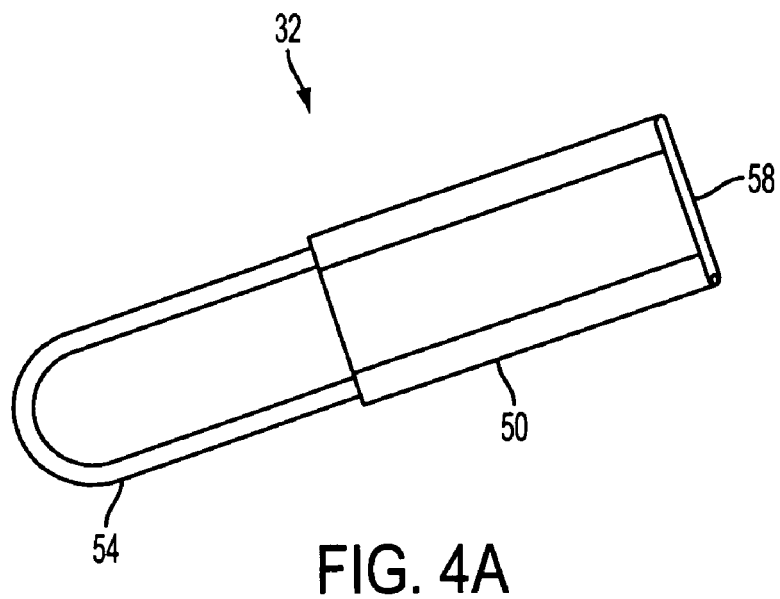
FIG. 4A shows a preferred embodiment of an adjustable chain saw scabbard that is removeable from the case.
Figure 4B:
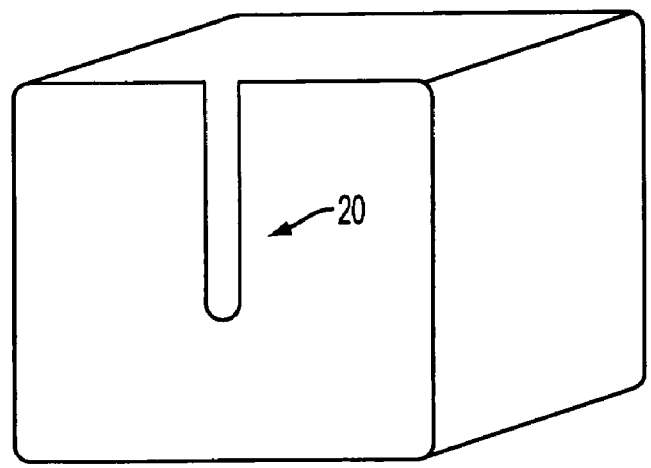
FIG. 4B shows a preferred embodiment of an adjustable chain saw scabbard having a slot for receiving a removeable scabbard.

The proximal end 58 of the first scabbard portion 50 engages a slot 20 in the side wall 62 of the main compartment 12 of the case 4. The first scabbard portion 50 can also be removed from the slot 20, as shown in FIGS. 4A and 4B. For example, the proximal end 58 of the first scabbard portion 50 slides into and nests in the slot 20, which may have any shape, for example a "U" shape. The proximal end 58 of the first scabbard portion 50 thus engages the side wall 62 so that the chain saw bar 42 of a chain saw 8 placed in the main compartment 12 of the case 4 can be housed in the scabbard 32, while the main body 42 of the chain saw 8 is held in the main compartment 12. The proximal end 58 of the first scabbard portion 50 can be unfitted from the slot 20, and thus the scabbard 32 can be entirely removed from the case 4. The scabbard 32 can then be placed inside the main compartment 12 for shipping or shipped separately from the case 4. Thus, the shipping and storage of the case is more convenient and efficient.

The second scabbard portion 54 has a proximal end 102 and a distal end 104.

The scabbard 32 has a cross section that is substantially in the shape of an elongated "C". In the scabbard 32 shown in FIG. 3, the elongated "C" shape of the scabbard 32 is an inverted "C". The elongated "C" shape allows for an open portion on one side of the cross section of the scabbard 32. The first scabbard portion 50 has a longitudinal wall 66, a top wall 70, a bottom wall 74, and longitudinal wall portions 78. A distance d1 separates the longitudinal wall portions. The top wall 70 and the bottom wall 74 are curved and opposite to one another. The longitudinal wall 66 is substantially parallel to the longitudinal wall portions 78. Along the top wall 70 of the first scabbard portion 50 are a plurality of notches 80. Alternatively, the notches 80 may be along the bottom wall 74 of the first scabbard portion 50 or along both the bottom wall 74 and the top wall 70.

The second scabbard portion 54 has a longitudinal wall 86, a top wall 90, a bottom wall 94, and longitudinal wall portions 98. A distance d2 separates the longitudinal wall portions 98. The top wall 90 and the bottom wall 94 are curved and opposite to one another. The longitudinal wall 86 is substantially parallel to the longitudinal wall portions 98. The proximal end 102 of the second scabbard portion 54 includes a resilient ridge portion or protrusion (not shown). Shape and dimension of the ridge portion are complementary to each notch 80 such that the ridge portion fits within each notch 80.

In another embodiment, the notches 80 are included on second scabbard portion 54, and the resilient ridge or protrusion is on the first scabbard portion 50.

The second scabbard portion 54 slideably inserts into the first scabbard portion 50. The proximal end 102 of the second scabbard portion 54 inserts into the distal end 60 of the first scabbard portion 50 such that the second scabbard portion 54 slides within the first scabbard portion 50. The second scabbard portion 54 is free to slide within the first scabbard portion 50 until the ridge of the second scabbard portion 54 engages one of the plurality of notches 80.

When the ridge engages a first of a plurality of notches 80a, the scabbard 32 has a first predetermined length; when the ridge engages a second of the plurality of notches 80b, the scabbard 32 has a second predetermined length; when the ridge engages a third of the plurality of notches 80c, the scabbard 32 has a third predetermined length. In a preferred embodiment, the first, second and third predetermined lengths are designed to hold chain saw bars having 20, 18, and 16 inches, respectively. Accordingly, one scabbard, and one chain saw case, accommodates 16 inch, 18 inch & 20 inch chain bars. Of course, other lengths of chain saw bar that can be accommodated is not limited to the disclosed lengths. The length of each scabbard portion, the placement of the notches, and the overall lengths of the scabbard can be designed to accommodate any desired length of chain saw bar.

The resilient ridge is deformable and thus can be released from the notch 80. Thus, the second scabbard portion 54 is free to slide within the first scabbard portion, and the resilient ridge is available to engage another of the plurality of notches 80. Therefore, the length of the scabbard 32 can be changed. Also, when no notch is engaged, the scabbard 32 can be collapsed by sliding the second scabbard portion 54 into the first scabbard portion 50. For shipping or storage, the scabbard 32 can be removed from the slot 20 in the side wall 62 collapsed, and placed inside the main compartment 12 of the case 4. Because the scabbard 32 collapses, the scabbard can be placed inside the case 4 during shipment, thus reducing shipping cost and space required while in distribution.

The distances d1 and d2 between the longitudinal wall portions 78 and 98, respectively, form a longitudinal opening 108 along one side of the scabbard 32. The opening 108 allows a portion of a chain saw bar 42 held in the scabbard 32 to be seen when the cover 24 is fitted onto the base 16 to hold a chain saw 8 within the chain saw case 4. Such visibility of the chain bar 42 allows for merchandising or branding information on the chain bar 42 to be seen. This allows for the chain saw 8 not only to be merchandised while in the retail store, but serves as a walking advertisement that builds brand image for the manufacturer while the consumer has the chain saw 8 safely inside his case. The scabbard 32 is designed to have an opening on one side only.

Preferably, the chain saw case 4 is manufactured using the injection molding process to achieve the unique features.

It will be apparent to those skilled in the art that various modifications and variation can be made in the chain saw case of the present invention without departing from the spirit or scope of the invention. Thus, it is intended that the present invention cover the modifications and variations of this invention provided they come within the scope of the appended claims and their equivalents.

What is claimed is:

1. A chain saw case comprising:
   a main compartment for housing a chain saw body; and a scabbard extending from a side wall of the main compartment, the scabbard including a first scabbard portion detachably engaged in the side wall of the main compartment and a second scabbard portion slideably inserted into a distal end of the first scabbard portion; the first scabbard portion including a plurality of mating features which engage with mating features of the second scabbard portion and stop movement of the second scabbard portion wherein the mating features are intermittently disposed on the scabbard portions such that the scabbard portions are fixed relative to one another at multiple positions and wherein the first scabbard portion comprises a first longitudinal wall, a first top wall, a first bottom wall and first longitudinal wall portions: the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and wherein the second scabbard portion comprises a second longitudinal wall, a second top wall, a second bottom wall and second longitudinal wall portions; the second longitudinal wall substantially parallel to the second longitudinal wall portions; the second too wall and the second bottom wall opposite one another and adjacent to the second longitudinal wall and the second longitudinal wall portions; the second longitudinal wall portions substantially in line with one another and separated by a second predetermined distance.

2. The chain saw case of claim 1, wherein the first predetermined distance and the second predetermined distance are equal.

3. The chain saw case of claim 1, wherein the mating features are along the first top wall.

4. The chain saw case of claim 1, wherein the mating features are along the first bottom wall.

5. The chain saw case of claim 1, wherein the first scabbard portion slideably engages a slot in the side wall.

6. A chain saw case comprising:
a main compartment;
a scabbard detachably extending from a side wall of the main compartment, the scabbard including a first scabbard portion and a second scabbard portion, the second scabbard portion slideably insertable into the first scabbard portion;
a plurality of notches on the first scabbard portion; and a protrusion on the second scabbard portion, the protrusion having a shape to engage one of the plurality notches when the second scabbard portion is inserted into the first scabbard portion and intermittently fix movement of the second scabbard portion within the first scabbard portion wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

7. The chain saw case of claim 6, wherein the protrusion is a resilient ridge.

8. The chain saw case of claim 6, wherein the protrusion is on an end of the second scabbard portion.

9. The chain saw case of claim 6, wherein the side wall includes a slot and wherein the scabbard slideably engages the slot.

10. The chain saw case of claim 6, wherein the first predetermined distance and the second predetermined distance are equal.

11. The chain saw case of claim 6, wherein the notches are along the first top wall.

12. The chain saw case of claim 6, wherein the notches are along the first bottom wall.

13. The chain saw case of claim 12, wherein the side wall includes a slot and wherein the scabbard slideably engages the slot.

14. A chain saw case capable of being manufactured by injection molding, comprising:
a main compartment;
a scabbard detachably extending from a side wall of the main compartment, the scabbard including a first scabbard portion and a second scabbard portion, the second scabbard portion slideably insertable into the first scabbard portion;
a plurality of notches on the first scabbard portion; and a protrusion on the second scabbard portion, the protrusion having a shape to engage one of the plurality notches when the second scabbard portion is inserted into the first scabbard portion and intermittently fix movement of the second scabbard portion within the first scabbard portion wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

15. A chain saw case comprising:
a main compartment for housing a chain saw body; and
a scabbard extending from a side wall of the main compartment, the scabbard including a first scabbard portion detachably engaged in the side wall of the main compartment and a second scabbard portion slideably inserted into a distal end of the first scabbard portion; the second scabbard portion including a plurality of mating features which engage with mating features of the first scabbard portion and stop movement of the second scabbard portion wherein the mating features are intermittently disposed on the scabbard portions such that the scabbard portions are fixed relative to one another at multiple positions, and wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

16. The chain saw case of claim 15, wherein the side wall includes a slot and wherein the scabbard slideably engages the slot.

17. The chain saw case of claim 15, wherein the first predetermined distance and the second predetermined distance are equal.

18. The chain saw case of claim 15, wherein the mating features are along the second top wall.

19. The chain saw case of claim 15, wherein the mating features are along the second bottom wall.

20. A chain saw case comprising:
a main compartment;
a scabbard detachably extending from a side wall of the main compartment, the scabbard including a first scabbard portion and a second scabbard portion, the second scabbard portion slideably insertable into the first scabbard portion;
a plurality of notches on the second scabbard portion; and
a protrusion on the first scabbard portion, the protrusion having a shape to engage one of the plurality notches when the second scabbard portion is inserted into the first scabbard portion and intermittently fix movement of the second scabbard portion within the first scabbard portions wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and
wherein the second scabbard portion comprises a second longitudinal wall, a second ton wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

21. The chain saw case of claim 20, wherein the protrusion is a resilient ridge.

22. The chain saw case of claim 20, wherein the side wall includes a slot and wherein the scabbard slideably engages the slot.

23. The chain saw case of claim 20, wherein the first predetermined distance and the second predetermined distance are equal.

24. The chain saw case of claim 20, wherein the notches are along the first top wall.

25. The chain saw case of claim 20, wherein the notches are along the first bottom wall.

26. The chain saw case of claim 20, wherein the protrusion is on an end of the first scabbard portion.

27. A case for a power operated tool comprising:
a main compartment for housing a power operated tool; and
a scabbard extending from a side wall of the main compartment, the scabbard including a first scabbard portion attached to the side wall of the main compartment and a second scabbard portion slideably inserted into a distal end of the first scabbard portion;
the first scabbard portion including a fastener for intermittently fixing movement of the second scabbard portion within the first scabbard portion, wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and
wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

28. A chain saw case comprising:
a main compartment for housing a chain saw body; and
a scabbard extending from a side wall of the main compartment, the scabbard including a first scabbard portion engaged in the side wall of the main compartment and a second scabbard portion slideably inserted into a distal end of the first scabbard portion;
the first scabbard portion including a plurality of mating features which engage with mating features of the second scabbard portion and stop movement of the second scabbard portion where the mating features are intermittently disposed on the scabbard portions such that the scabbard portions are fixed relative to one another at multiple positions, wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and
wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

29. The chain saw case of claim 28, wherein the first predetermined distance and the second predetermined distance are equal.

30. The chain saw case of claim 28, wherein the mating features are along the first top wall.

31. The chain saw case of claim 28, wherein the mating features are along the first bottom wall.

32. The chain saw case of claim 28, wherein the first scabbard portion slideably engages a slot in the side wall.

33. A scabbard comprising:
a first scabbard portion having two open ends, the first scabbard portion including a plurality of notches; and
a second scabbard portion being configured for slideable insertion into the first scabbard portion, the first scabbard portion having mating features which engage with mating features of the second scabbard portion and stop movement of the second scabbard portion wherein the mating features are intermittently disposed on the scabbard portions such that the scabbard portions are fixed relative to one another at multiple positions, and wherein the first scabbard portion comprises a first longitudinal wall, a first top wall, a first bottom wall and first longitudinal wall portions; the first longitudinal wall substantially parallel to the first longitudinal wall portions; the first top wall and the first bottom wall opposite one another and adjacent to the first longitudinal wall and the first longitudinal wall portions; the first longitudinal wall portions substantially in line with one another and separated by a first predetermined distance; and
wherein the second scabbard portion comprises a second longitudinal wall, a second top wall, a second bottom wall and second longitudinal wall portions; the second longitudinal wall substantially parallel to the second longitudinal wall portions; the second top wall and the second bottom wall opposite one another and adjacent to the second longitudinal wall and the second longitudinal wall portions; the second longitudinal wall portions substantially in line with one another and separated by a second predetermined distance.

34. The scabbard of claim 33, wherein the first predetermined distance and the second predetermined distance are equal.

35. The scabbard of claim 33, wherein the mating features are along the first top wall.

36. The scabbard of claim 33, wherein the mating features are along the first bottom wall.

37. The chain saw case of claim 1, wherein the mating features of the first and second scabbard portions include a notch and a protrusion.

38. The chain saw case of claim 15, wherein the mating features of the first and second scabbard portions include a notch and a protrusion.

39. The chain saw case of claim 28, wherein the mating features of the first and second scabbard portions include a notch and a protrusion.

40. The scabbard of claim 33, wherein the mating features of the first and second scabbard portions include a notch and a protrusion.

* * * * *